C. W. MEADOWCROFT, Sr.
KEY BEARING FOR PADLOCKS.
APPLICATION FILED JULY 10, 1918.

1,338,515.

Patented Apr. 27, 1920.

Inventor:
Charles W. Meadowcroft Sr.
by his Attorneys.
Howson & Howson

UNITED STATES PATENT OFFICE.

CHARLES W. MEADOWCROFT, SR., OF PHILADELPHIA, PENNSYLVANIA, ASSIGNOR TO MILLER LOCK COMPANY, OF PHILADELPHIA, PENNSYLVANIA, A CORPORATION OF PENNSYLVANIA.

KEY-BEARING FOR PADLOCKS.

1,338,515.   Specification of Letters Patent.   Patented Apr. 27, 1920.

Application filed July 10, 1918.  Serial No. 244,266.

*To all whom it may concern:*

Be it known that I, CHARLES W. MEADOW-CROFT, Senior, a citizen of the United States, residing in Philadelphia, Pennsylvania, have invented certain Improvements in Key-Bearings for Padlocks, of which the following is a specification.

One object of my invention is to design the bearings so that the preponderance of weight will be at the slot, the tendency of the bearing being to remain in position with the slot in line with the slot in the casing so as to enable a key to be inserted in the lock without having first to turn the bearing to the proper position.

A further object of the invention is to design the key bearing so that it can be made from a sheet metal blank.

Figure 1:
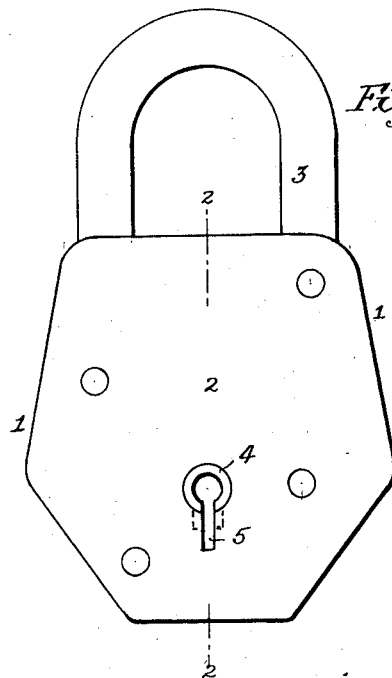
Figure 1 is a face view of a padlock illustrating my invention.
Figure 2:
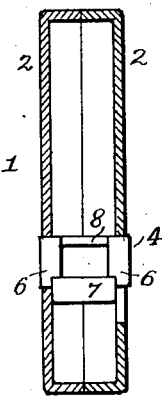
Fig. 2 is a sectional plan view on the line 2—2, Fig. 1; showing only the casing and the key hub, the bolt and the operating mechanism being omitted.
Figure 3:
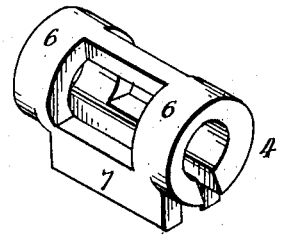
Fig. 3 is a detached perspective view of my improved key bearing.
Figure 5:
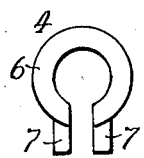
Fig. 5 is an end view.
Figure 6:
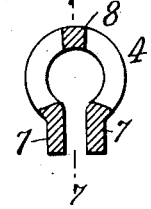
Fig. 6 is a sectional view on the line 6—6, Fig. 4.
Figure 4:
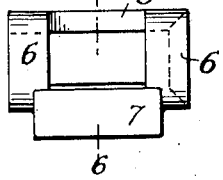
Fig. 4 is a side view.
Figure 7:
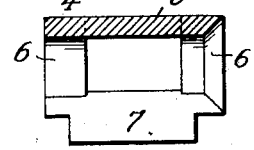
Fig. 7 is a longitudinal sectional view on the line 7—7, Fig. 6.
Figure 8:
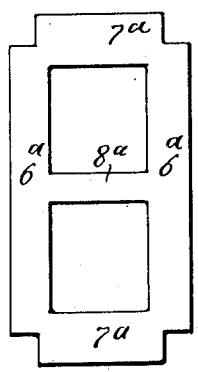
Fig. 8 is a plan view of the blank from which the key bearing is made.

Referring to the drawings, 1 is the casing of a padlock, made in two parts 2—2, as illustrated in Fig. 2. 3 is the shackle and 4 is the key bearing adapted to the openings in each of the parts 2 of the casing. The front part of the casing has a key slot 5, as shown in Fig. 1. In the present instance, this key bearing is made from a blank shown clearly in Fig. 8 having end portions 6ª, which form the ends 6 which have their bearings in the casing 4 and connecting members 7ª and 8ª. The members 7ª form the key guides 7 of the bearing and the portion 8 forms the upper connecting member, which also acts as the upper guide for the key and prevents it from tilting when being inserted. The blank is bent, as shown in Fig. 3, and the end members 6 are cylindrical so that they fit neatly in the opening in the casing. The connecting portion 7 is shorter than the main bearing portion, as illustrated in Fig. 4, and fits between the two walls of the casing, as shown clearly in Fig. 2, holding the center in the proper position.

It will be noticed that the portions 7 of the key bearing are made solid, and are of such depth that they overbalance the remainder of the key bearing so that when the key is withdrawn the key bearing will remain in position in line with the slot in the casing. It has been the usual practice to make the slotted portion of the key bearing lighter than the remaining portion, consequently, the tendency was for the key bearing to turn so that its slot was out of line with the slot in the casing and the key had to be partially inserted in the lock to engage the bearing and then the bearing had to be turned to bring the key in alinement with the slot in the casing, after which the key could be fully inserted, the portion 7 forming the way for the key, yet not interfering with the tumblers or bolt, which are actuated by the key.

Figure 9:
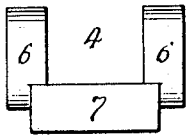
Figs. 9, 10 and 11 are views of modifications of the invention.

In Fig. 9, I have illustrated the bearing without the upper connecting piece 8, as this may be used where an upper guide is not necessary.

Figure 10:
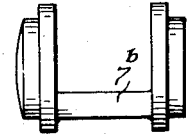
Figure 11:
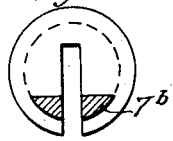

In Figs. 10 and 11, I have illustrated my invention as applied to a key bearing made of a solid piece shaped to form and the upper portion of the central barrel is cut away, leaving portions 7ᵇ on each side of the slot for the key. These portions overbalance the remaining portion of the bearing and will remain in the lowest position with the slot in the bearing in line with the slot in the casing.

Thus it will be seen that I am enabled to make a key bearing in which the slot therein will normally be at the bottom and in line with the key slot 5 in the casing. I am also enabled to make it out of sheet metal. The depending portions 7 not only act as key guides and weights, but they also hold the bearing in a central position in respect to the casing.

I claim:

1. The combination in a lock, of a casing; a key bearing mounted in the casing, said key bearing having cylindrical portions at each end adapted to the casing and having two longitudinal members spaced apart to form a key-way and connecting the two cylindrical portions, the space between the two cylindrical portions and above the longitudinal members being open so that the preponderance of weight of said longitudinal members will tend to keep the key bearing in the vertical position with the key slot at the bottom.

2. A key bearing for a lock having a cylindrical portion at each end adapted to the casing of a lock and having two longitudinal members connecting the two cylindrical members, said longitudinal members extending below the cylindrical members and spaced apart to form a key-way and a narrow, connecting member at the upper portion of the key bearing, said key bearing being open at each side between the cylindrical end members.

In witness whereof I affix my signature.

CHARLES W. MEADOWCROFT, Sr.